C. C. HINKLEY.
THILL-COUPLING.
No. 191,285. Patented May 29, 1877.
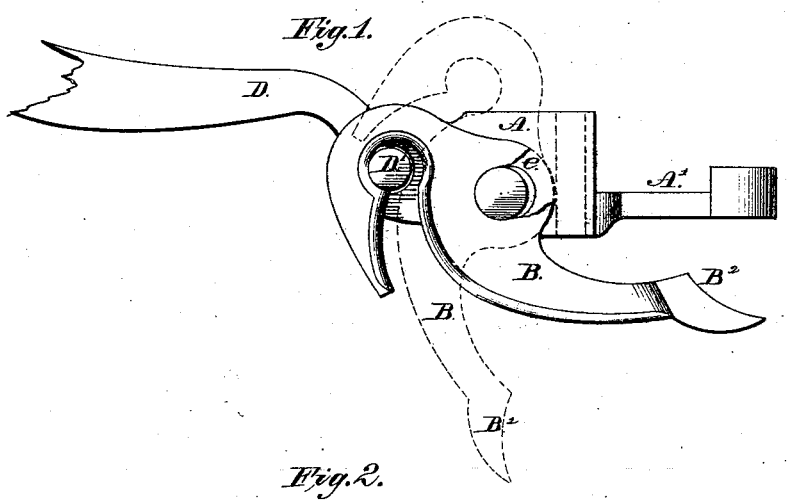
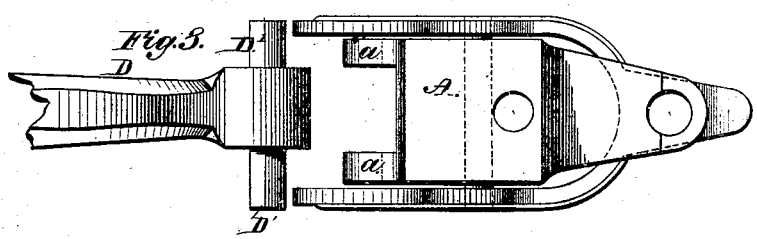
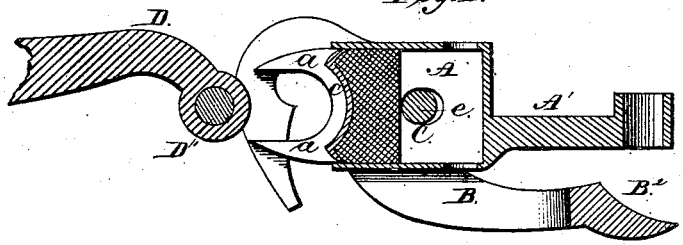
Witnesses:
Charles S. Forde
Peter S. Crawford
Inventor:
Charles C. Hinkley
By G. W. Dord,
Atty.

UNITED STATES PATENT OFFICE.

CHARLES C. HINKLEY, OF ROCKFORD, ILLINOIS, ASSIGNOR TO HIMSELF AND JAMES D. TANNER, OF SAME PLACE.

IMPROVEMENT IN THILL-COUPLINGS.

Specification forming part of Letters Patent No. 191,285, dated May 29, 1877; application filed September 1, 1876.

*To all whom it may concern:*

Be it known that I, CHARLES C. HINKLEY, of Rockford, in the county of Winnebago and State of Illinois, have invented a new and useful Improvement in Thill-Couplings; and I do hereby declare that the following is a full and exact description of the same, reference being had to the accompanying drawings, and to the letters of reference marked thereon.

Figure 1 is a side view of the coupling in working position, with dotted lines showing the position of the hook when raised for uncoupling. Fig. 2 is a plan view of the coupling-iron or shell detached. Fig. 3 is a plan view of the thill-attaching iron uncoupled, and Fig. 4 is a longitudinal sectional view of the coupling with the coupling-hook removed, and showing the rubber and mode of attaching to prevent rattling.

Similar letters of reference denote corresponding parts in all of the figures.

The object of the invention is to provide a shackle or coupling whereby the thills of carriages or other vehicles may be readily removed by the raising or unclasping of a bifurcated hooked bail, the hooks of which pass forward of a pin in the thill-iron, which forms the connection between the shafts and the running-gear, and so formed that a pole may be substituted therefor, and vice versa, without the removal of bolts or any other parts, thus economizing time in the change and space in the storage of the vehicle by the said removal, as will be hereinafter explained.

The invention consists of a rectangular-shaped hollow shell, secured to the axle by means of a recess and screw-clamp, and having upon the longitudinal sides a hinged bifurcated hooked bail for holding the shafts in working position. It also has a flexible metal-faced bearing, against which the heel part of the thill-iron rests, for a purpose which will be hereinafter described.

In the drawings, A represents the metal shell, and A' the notch within the same for securing the part to the axle of the vehicle. B is a bifurcated hooked metal bail, pivoted to the shell A in such manner that, by swinging the bail and raising the hooks, the thills or pole can be readily attached and detached at the pleasure of the operator. $B^2$ is a thumb-piece attached to the said bail, and by which it is operated. C is a piece of rubber or other yielding substance, placed within the cavity made for that purpose in the shell A.

C' is a metal facing to the rubber C, concaved upon its face so as to fit against the rounded portion of the thill-iron, for the purpose of preventing the undue wearing away of the rubber, which would be done were not this metal facing used. It will be understood that this rubber, by the continual pressure of the facing-plate against the thill-attaching iron, prevents all rattling of the parts.

D represents the iron attached to the thills or pole, and D' the pivot by which the same is connected through the instrumentality of the coupling with the carriage.

This pivot D' is made cylindrical in form, and is a part of the iron D, and so made as to allow of the free vertical movement necessary in the use of the thills or pole. *a* are recessed ears or points, concaved at their bottoms to correspond with the form of the pivot D', and are located upon the forward end of the shell A, and forming a part of the same. When connected, the pivot D' of the thill-iron rests within these ears *a*, and against the bottom of the same, and the parts are held in place by the hooks upon the bail B, which pass over and forward of the pin.

To prevent accidental displacement of the thills when in the act of backing the horse and the attached carriage, a slight elongation is given the hole in the shell through which the bail connecting the pivot passes, as shown at *e* in Fig. 1.

It will be observed that when the back pressure comes against the rear side of the hooked part of the bail the whole of the bail will yield slightly by means of the elongated hole, and allow the connecting-pin of the bail to come against the forward leg of the screw-staple or clamp, which passes through the forward hole of the shell, and by which the said shell is secured to the axle, and thus keeping the hook at all times in the same relative position with the pin D′, and compensates for any wear occasioned by use.

The operation is as follows: When it is desired to couple the thills or pole to the vehicle the hand of the operator is applied to the thumb-piece B¹ lying beneath the rear end of the piece A, and by this thumb-piece the bail is swung forward, which raises the hooks, when the iron carrying the pin D′ is inserted within the recesses for that purpose provided upon the front of the shell, with the pin resting against the concave bottoms of the recesses in the ears a, the rounded end of the iron D resting against the metal-faced rubber, when the bail, by the use of the aforesaid thumb-piece, is swung back, the hooks passed forward of the pin, and as the curves of the hooks are upon the radius of a circle of which the pivotal bail-connection is the center the shafts are drawn in position against the anti-rattler before described, and the same is locked by notches or indentations in the hook resting against the pin.

When it is desired to uncouple the shafts the bifurcated bail, by the use of the thumb-piece, is thrown forward, the hooks raised, and the shafts are released, all of which will be understood without further description.

Having now described my invention, what I claim as new, and desire to secure by Letters Patent, is—

1. The combination of the metal shell A and bifurcated hooked bail B, having the thumb-piece B′ attached thereto, substantially as described, and for the purpose set forth.

2. The combination of the rubber C, having the metal facing C′ inclosed within the shell A, the bifurcated hook B, shell A, and thill-iron D, arranged and operating substantially as described, and for the purpose set forth.

This specification signed and witnessed this 14th day of August, 1876.

CHARLES C. HINKLEY.

Witnesses:
 G. W. FORD,
 CHARLES S. FORD.